(12) United States Patent
Jang et al.

(10) Patent No.: US 9,389,977 B2
(45) Date of Patent: Jul. 12, 2016

(54) FAULT INJECTION TESTING APPARATUS AND METHOD

(71) Applicant: Altibase Corp., Seoul (KR)

(72) Inventors: Shi Bok Jang, Incheon (KR); Jae Hyo Lee, Seoul (KR); Ying Zhe Ma, Seoul (KR)

(73) Assignee: Altibase Corp., Seoul (KR)

( * ) Notice: Subject to any disclaimer, the term of this patent is extended or adjusted under 35 U.S.C. 154(b) by 100 days.

(21) Appl. No.: 14/491,404

(22) Filed: Sep. 19, 2014

(65) Prior Publication Data

US 2015/0378859 A1 Dec. 31, 2015

(30) Foreign Application Priority Data

Jun. 25, 2014 (KR) .................. 10-2014-0078380

(51) Int. Cl.
*G06F 11/263* (2006.01)
*G06F 11/36* (2006.01)

(52) U.S. Cl.
CPC .......... *G06F 11/263* (2013.01); *G06F 11/3624* (2013.01)

(58) Field of Classification Search
CPC .................... G06F 11/263; G06F 11/3624
USPC ....................................... 714/35, 41
See application file for complete search history.

(56) References Cited

U.S. PATENT DOCUMENTS

| | | | |
|---|---|---|---|
| 6,216,237 B1 * | 4/2001 | Klemm | G06F 11/3644 714/35 |
| 9,170,904 B1 * | 10/2015 | LeCrone | G06F 11/261 |
| 2005/0223357 A1 * | 10/2005 | Banerjee | G06F 11/3676 717/120 |
| 2009/0138956 A1 * | 5/2009 | Schneider | H04L 67/327 726/12 |
| 2010/0287535 A1 * | 11/2010 | Kim | G06F 11/3688 717/127 |
| 2011/0154121 A1 * | 6/2011 | Dern | G06F 11/3676 714/38.1 |
| 2014/0258783 A1 * | 9/2014 | Fenster | G06F 11/3688 714/38.1 |
| 2015/0143179 A1 * | 5/2015 | Desai | G06F 11/3688 714/38.1 |
| 2015/0212923 A1 * | 7/2015 | Sugiyama | G06F 11/3644 714/38.1 |
| 2015/0227448 A1 * | 8/2015 | Goel | G06F 11/3466 717/131 |
| 2015/0286557 A1 * | 10/2015 | Tsaur | G06F 11/3624 717/128 |

FOREIGN PATENT DOCUMENTS

JP    2012113616 A    6/2012
KR    10-2010-0121226 A    11/2010

OTHER PUBLICATIONS

*Fault Injection* from Wikipedia—http://en.wikipedia.org/wiki/Fault_injection, dated Sep. 16, 2014.
Journal published by Korea Institute of Information Security and Cryptology vol. 16, No. 5 (Oct., 2006).
Office Action dated Mar. 22, 2016 corresponding to Korean Patent Application No. 10-2015-0078380.

* cited by examiner

*Primary Examiner* — Chae Ko
(74) *Attorney, Agent, or Firm* — Kilpatrick Townsend & Stockton LLP

(57) ABSTRACT

Provided are fault injection testing apparatus and method which inject faults that may occur in a system or a source file that a user wants to examine and examine which processes are performed by the system or source file when the faults occur.

13 Claims, 6 Drawing Sheets

FIG. 3

```
                    sdd DataFile.cpp FILE

IDE_RC sddDataFile::initialize (scSpaceID      aTableSpaceID,
                    sddDataFileNode*  aDataFileNode,
                    smiDataFileAttr*  aDataFileAttr,
                    UInt              aMaxDataFilePageCount,
                    idBool            aCheckPathValidate )
{
  .....

if (aCheck Path Validate == ID_TRUE)
  {
     IDE_TEST (sctTableSpaceMgr::makeValidABSPath(
                    ID_TRUE,
                    sDataFileAttr→mName,
                    &aDataFileAttr→mNamelength,
                    SMI_TBS_DISK)
          != IDE_SUCCESS );
  } aDataFileNode → mName = NULL;

IDE_TEST_RAISE (iduMemMgr::malloc(
               IDU_MEM_SM_SDD,
               aDataFileAttr → mNameLength + 1,
               (void**)&(aDataFileNode → mName)) != IDE_SUCCESS,
          insufficient_memory );

idlOS::memset(aDataFileNode → mName, 0x00, aDataFileAttr → mNameLength +1):
  idlOS::strcpy(aDataFileNode → mName, aDataFileAttr → mName);
  sState = 2;

```
         IDE_RC rcnSocketSend (acp_sock_t   *aSocket,
                        const void   * aBuffer,
                        ULong        aBufferSize,
                        ULong       * aSendSize )
         {
           acp_rc_t sRC;
S410 ──    IDU_FIT_POINT_RAISE( *rcnSocketSend::acpSockSend::TIMEOUT",ERR_SOCK_SEND_TIMEOUT);
S420 ──    IDU_FIT_POINT_RAISE( *rcnSocketSend::acpSockSend::ERR_SOCK",ERR_SOCK_SEND);
           sRC = acpSockSend( aSocket,
                        aBuffer,
                        aBufferSize,
                        aSendSize,
                        0 );
           switch (sRC)
           {
               case ACP_RC_SUCCESS;
         #if (EWOULDBLOCK != EAGAIN)
               case ACP_RC_EAGAIN;
         #endif
               case ACP_RC_EWOULDBLOCK;
                  break;
               case ACP_RC_ETIMEDOUT;
                  IDE_RAISE( ERR_SOCK_SEND_TIMEOUT );
                  break;
               case ACP_RC_EINTR;

break;
               default;
                  IDE_RAISE(ERR_SOCK_SEND );
                  break;
           }
           return IDE_SUCCESS;
           IDE_EXCEPTION (ERR_SOCK_SEND_TIMEOUT);
           {
           IDE_SET(ideSetErrorCode(rcERR_ABORT_SOCKET_SEND_TIMEOUT));
           }
           IDE_EXCEPTION(ERR_SOCK_SEND);
           {
             IDE_SET(ideSetErrorCode(rcERR_ABORT_SOCKET_SEND));
           }
           IDE_EXCEPTION_END;
            return IDE_FAILURE;
         }
```

FIG. 5

| RESULT OF CHECKING WHETHER FAULTS OCCUR | | | | | | |
|---|---|---|---|---|---|---|
| % fitclient lst<br>FIT ENABLE [ON] | | | | | | |
| ID UID<br>REPETITION | | SID | HIT | TOTAL | ACTION | ACTIVATION |
| 1 sddDataFile::initialize::malloc::ERR_MEM<br>NONE | | DEFAULT | 1 | 1 | JUMP | YES |

FAULT INJECTION TESTING APPARATUS AND METHOD

RELATED APPLICATION

This application claims the benefit of Korean Patent Application No. 10-2014-0078380, filed on Jun. 25, 2014, in the Korean Intellectual Property Office, the disclosure of which is incorporated herein in its entirety by reference.

BACKGROUND

1. Field

One or more embodiments of the present invention relate to a fault injection testing apparatus and method, and more particularly, to a fault injection testing apparatus and method of testing quality of a target system or a source file by injecting faults.

2. Description of the Related Art

Fault injection is a test technique which injects faults into computer programs, etc., and particularly, a test technique used to handle errors. A link below is a non-patent reference of the present invention: http://en.wikipedia.org/wiki/Fault_injection

SUMMARY

One or more embodiments of the present invention include intentionally injecting faults into a target system or a source file that a user wants to examine or test and testing quality of the target system or source file by checking a fault processing result.

Additional aspects will be set forth in part in the description which follows and, in part, will be apparent from the description, or may be learned by practice of the presented embodiments.

According to one or more embodiments of the present invention, there is provided a fault injection testing apparatus for testing quality of a source file by interacting with a fault injection test (FIT) client, the fault injection testing apparatus including: an FIT point setting unit for setting one or more FIT points in the source file via the FIT client; a fault injection unit for injecting one or more faults to be respectively performed at the one or more FIT points in the FIT client; a fault action performance unit for receiving fault actions, which are countermeasures to the one or more faults to be respectively performed at the one or more FIT points, from an FIT server and performing the received fault actions; and a display unit for displaying a fault action performance result on the FIT client, wherein the fault injection testing apparatus communicates with the FIT server in each of the FIT points.

According to one or more embodiments of the present invention, there is provided a fault injection testing method using a fault injection test (FIT) in a fault injection testing apparatus, which is performed by a computer, the fault injection testing method including: setting one or more FIT points in a source file via a FIT client; injecting one or more faults to be respectively performed at the one or more FIT points into the FIT client; receiving fault actions, which are countermeasures to the one or more faults to be respectively performed at the one or more FIT points, from an FIT server, and performing the received fault actions; and displaying a fault action performance result on the FIT client.

The fault injection testing apparatus may communicate with the FIT server at each of the one or more FIT points.

The fault injection testing method may further include setting a trigger count which performs a preset action only when identical faults occur a preset number of times or more after the injecting of the faults.

The fault injection testing apparatus may include a fault library in which the one or more injected faults and fault actions corresponding to the one or more injected fault are stored, and the fault library may further include a fault action performance result.

A function for setting call paths which receive actions from the FIT server may be supported when the one or more FIT points are set in the setting of the one or more FIT points and when the one or more faults, which are injected in the one or more FIT points and have the same fault type or different fault types, are sequentially performed in an order set by the FIT client.

Each of the one or more injected faults may include at least one of fault order information (ID) that indicates an order in which the one or more faults are injected into a source file, identifier information (UID) that identifies the one or more faults in the source file, fault occurrence information (ACTIVATION) that indicates whether the one or more faults have occurred, total number information (TOTAL) that indicates the occurrence number of times of faults that is normally allowed even though the one or more faults have occurred in the source file, number information (HIT) which indicates the number of times that the one or more faults have occurred in the source file, repetition information (REPETITION) which indicates whether the one or more faults need to repeatedly occur, fault action information (ACTION) which indicates the fault actions to be performed when the one or more faults occur, and identifier information of the FIT server which transmits the fault actions.

BRIEF DESCRIPTION OF THE DRAWINGS

These and/or other aspects will become apparent and more readily appreciated from the following description of the embodiments, taken in conjunction with the accompanying drawings in which:

FIG. 3 shows an FIT point setting unit according to an embodiment of the present invention;

FIG. 4 shows a fault injection unit in which faults are injected into respective FIT points, according to an embodiment of the present invention;

FIG. 5 shows that whether faults, which are injected into a source file by a user, occur is displayed on a display unit, according to an embodiment of the present invention.

DETAILED DESCRIPTION

One or more embodiments of the present invention include a fault injection testing apparatus and method that inject faults that may occur in a system or a source file that a user wants to examine and that examine which processes are performed by the system or source file when the faults occur.

For example, faults regarding a memory, an input and output (I/O), a network, etc. may be injected into the system or the source file. Then, which processes are performed by the system or source file for the injected faults may be examined.

For instance, process results of the system or the source file due to the injected faults may be as follows.

Halt Failure: every service with regard to the system is halted (FATAL).

Hang Failure: Results of all services with regard to the system are not output (HANG).

Erratic Failure: undesired results are output instead of desired results (error message).

According to one or more embodiments of the present invention, as described above, a user may predict problems that occur in a certain system, a source file, a program, or the like by using the fault injection testing apparatus and method and may recognize which faults occur in the system, the source file or the program.

Figure 1:
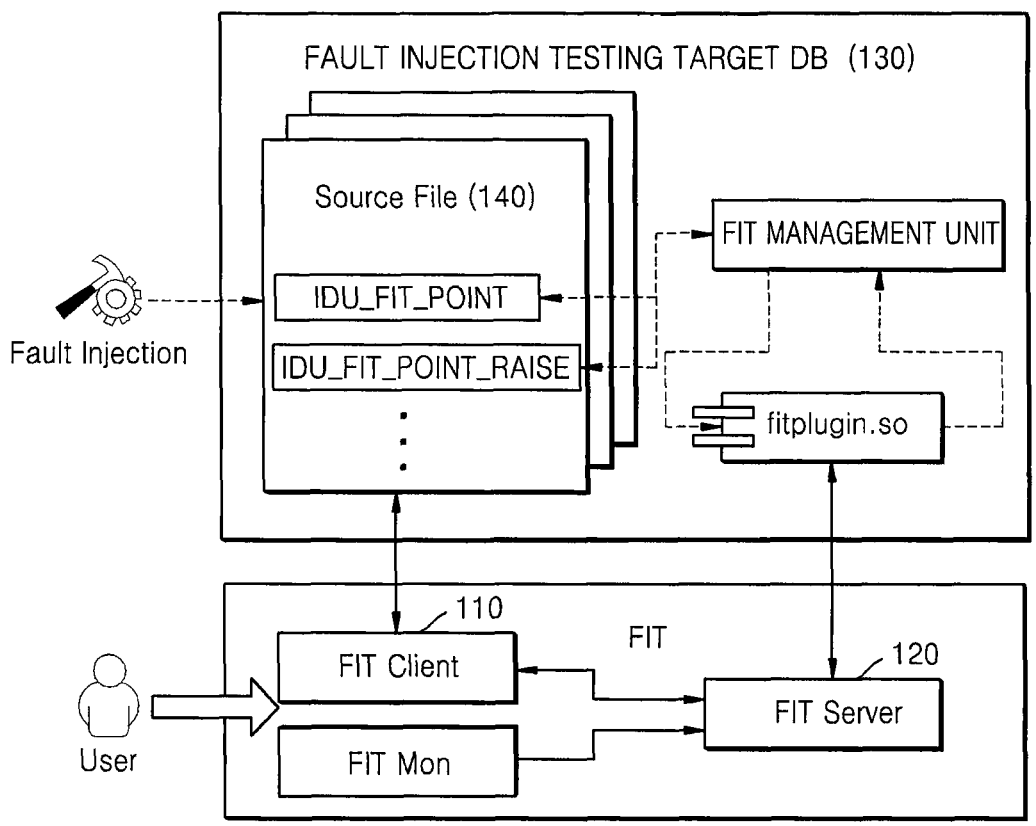
FIG. 1 is a diagram of a fault injection test (FIT) system according to an embodiment of the present invention.

FIG. 1 is a diagram of a fault injection test (FIT) system according to an embodiment of the present invention.

The FIT system includes a FIT client 110, a FIT server 120 and a fault injection testing target device 130.

The fault injection testing apparatus may be installed inside the FIT client 110 or may be configured as an external device. That is, the fault injection testing apparatus may be configured as an apparatus capable of interacting with the FIT client 110.

The user sets one or more FIT points in a source file 140 via the FIT client 110 and may inject one or more faults to be performed at each FIT point.

The fault injection testing apparatus receives fault actions, which are countermeasures to the faults respectively performed at the FIT points, from the FIT server 120 and performs the received fault actions. The FIT server 120 transmits fault actions, which are countermeasures to certain faults respectively performed at the FIT points, to the fault injection testing apparatus. Therefore, the fault injection testing apparatus may minutely control the faults.

Then, the fault injection testing apparatus displays fault action performance results on the FIT client 110. Examples of the fault action performance results are as follows.

When a fault action is a Kill, a fault injection testing target system is stopped. When a fault action is a Jump, errors occur in the fault injection testing target system. When a fault action is a Sleep, a function which makes the target system have a Hang fault is provided. Detailed descriptions will be provided later. Detailed descriptions about other fault action performance results will be provided later.

Figure 2:
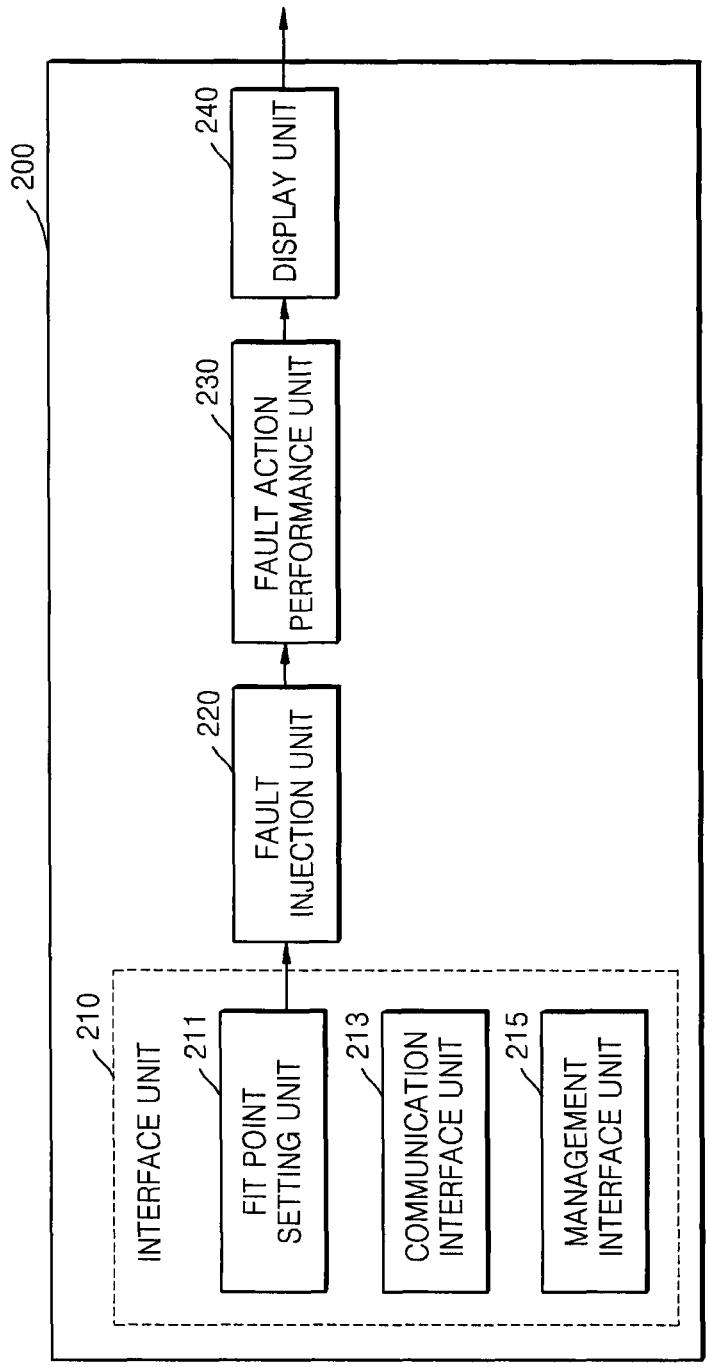
FIG. 2 is a block diagram of an internal structure of a fault injection testing apparatus, according to an embodiment of the present invention.

FIG. 2 is a block diagram of an internal structure of a fault injection testing apparatus 200, according to an embodiment of the present invention.

The fault injection testing apparatus 200 includes an FIT point setting unit 211, a fault injection unit 220, a fault action performance unit 230 and a display unit 240. In addition, the fault injection testing apparatus 200 may be configured to further include an interface unit 210, and the interface unit 210 may include a communication interface unit 213 which interacts with the FIT client 110 and a management interface unit 215 which adds, modifies, deletes and checks injected faults.

Functions of each component are described below.

The FIT point setting unit 211 sets one or more FIT points in a source file via the FIT client 110. That is, the FIT point setting unit 211 searches for locations of the source file where faults may occur. The fault injection testing apparatus 200 communicates with the FIT server 120 at each FIT point.

For example, it is assumed that faults may occur in a section regarding a memory as shown in FIG. 3, wherein the section is included in an sddDataFile of a smart module (SM). In this case, in FIG. 3, a section where a function iduMemMgr::malloc( ) is indicated is defined to have a fault. In this section, the fault injection testing apparatus 200 is configured to communicate with the FIT server 120.

The FIT point setting unit 211 sets a plurality of FIT points and may set call paths which receive fault actions from the FIT server 120 only when faults, which are injected in the plurality of FIT points and have the same fault type or different fault types, are sequentially performed in an order set by the FIT client 110.

The user may control an occurrence order of the faults by using a call path function and may check whether the faults sequentially occur in an order desired by the user.

The fault injection unit 220 injects one or more faults to be performed at respective FIT points set by the FIT point setting unit 211. In the present embodiment, the faults are formed of a unique identifier (UID) which identifies a macro that is IDU_FIT_POINT_IDU_FIT_POINT_RAISE and each of the faults.

IDU_FIT_POINT ("UID");

IDU_FIT_POINT_RAISE("UID", EXCEPTION_LABEL);

In this case, a generation rule of the fault UID is as follows.

[File or Class Name]::[Function Name]::[Target Statement]::[Fault Type]

Each identifier is described below.

A File or Class Name denotes a name of a file or class in which a statement that may have faults is included.

A Function Name denotes a name of a function in which a statement that may have faults is included.

A Target Statement denotes a name of a statement that may have faults.

A Fault Type describes exceptions when the faults occur.

FIG. 4 shows the fault injection unit 220 in which faults are respectively injected into first and second FIT points S410 and S420, according to an embodiment of the present invention. A TIMEOUT fault is injected into the first FIT point S410, and a SOCK ERROR fault is injected into the second FIT point S420. Information about the faults injected in the fault injection unit 220 is stored in the FIT server 120.

The faults injected by the fault injection unit 220 may have the same fault type or different fault types. The faults include at least one of a memory limit fault, a network limit fault, a file_descriptor fault and a recovery fault.

Each of the faults includes one or more pieces of information among pieces of information with regard to identifier (ID), UID, security identifier (SID), HIT, TOTAL, ACTION, ACTIVATION and REPETITION, and identifier information of the FIT server 120 which transmits the fault actions. In the present embodiment, the fault injection testing apparatus 200 may be configured to provide a distributed processing function. The FIT client 110, which interacts with the fault injection testing apparatus 200, may also perform distributed processing by receiving the fault actions with regard to one or more faults from at least one FIT server.

Therefore, the fault injection testing apparatus 200 may distribute a plurality of faults into different servers for processing, and in this case, each server is identified by using the identifier information of the FIT server.

Meanings of pieces of information except the identifier information are as follows.

ID: an order of registered faults

UID: a unique identifier of registered faults

SID: an identifier of a target server for distributed processing

HIT: the number of times when faults have passed in real time

TOTAL: the number of times when faults finally pass

ACTION: an action taken when faults occur

ACTIVATION: a state in which a certain fault occurs

REPETITION: a state in which an FIT repetition function is used

Examples of displaying the fault information are as follows.

ID: no. 1

UID: sddDataFile::initialize::malloc::ERR_MEM

SID: DEFAULT (indicated as DEFAULT when an SID option is inactive)

HIT: 0 (an initial value is 0)

TOTAL: 1 (different according to an input value. An initial value is 1.)

ACTION: JUMP

ACTIVATION: NO (means that a fault has not occur yet.)

REPETITION: NONE (means that a repetition function is inactivate.)

The fault action performance unit 230 receives fault actions, which are countermeasures with regard to the faults performed at one or more FIT points, from the FIT server 120.

When a fault action is a Kill, the fault injection testing target system is stopped. When a fault action is a Jump, errors occur in the fault injection testing target system. When a fault action is a Sleep, a function which makes the fault injection testing target system hanged is provided. In the present embodiment, the fault actions are countermeasures that are previously stored in the FIT server 120, and the user may store the fault actions by setting the same beforehand. Other actions will be described with reference to FIG. 5.

The fault action performance unit 230 may additionally perform a trigger count function. The trigger count function is a function that is set to perform a preset fault action only when identical faults occur more than a preset number of times in a source file that the user wants to test.

The display unit 240 displays a fault action performance result performed in the fault action performance unit 230 on the FIT client 110. The FIT client 110 may check a test result of the injected faults via the display unit 240. In this case, the FIT client 110 checks whether the injected faults occur and may test faults in the target system or the source file by checking whether a result is the same as a preset value set by the user. When the result is the same as the preset value, it is considered that there is no problem in the target system or source file. When the result is different from the preset value, it is considered that a problem occurs in the target system or source file, and thus the user may recognize that there are faults in the target system or source file.

FIG. 5 shows an example of displaying a fault performance result with regard to a sddDataFile initialize Fault, which is injected into the source file by the user, on the display unit 240, according to an embodiment of the present invention. When the injected fault is performed, an HIT value becomes 1, and the ACTIVATION shows YES. In addition, the fault action indicates that JUMP is performed.

In the present embodiment, the fault injection testing apparatus may provide an iteration function that repeatedly uses a certain fault. In the fault injection testing apparatus, a certain fault may repeatedly occur by using the iteration function.

The fault injection testing apparatus may be configured to further provide a fault library function which stores one or more injected faults and fault actions corresponding to the injected faults. In this case, the fault library function may additionally store a result of performing the fault actions corresponding to the faults.

Figure 6:
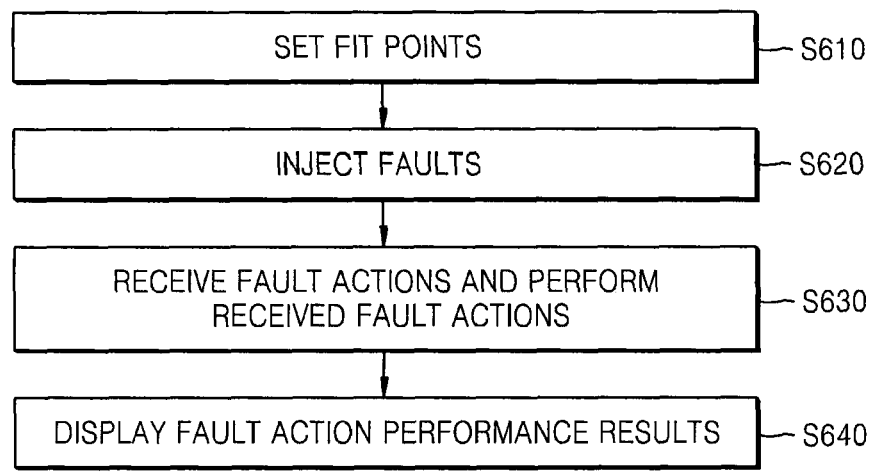
FIG. 6 is a flowchart for performing a fault injection test in a fault injection testing apparatus, according to an embodiment of the present invention.

FIG. 6 is a flowchart of a fault injection method using an FIT in the fault injection testing apparatus, according to an embodiment of the present invention.

The fault injection method using the FIT in the fault injection testing apparatus is performed by a computer.

The FIT client sets one or more FIT points in a source file in operation S610. The fault injection testing apparatus is configured to communicate with the FIT server 120 in each FIT point.

Then, one or more faults, which will be performed at respective FIT points, are injected in the FIT client 110 in operation S620. In this case, the injected faults may have the same fault type or different fault types. The injected faults include at least one of the memory limit fault, the network limit fault, the file_descriptor fault, and the recovery fault.

The fault injection testing apparatus receives fault actions, which are countermeasures to the faults respectively performed at the FIT points, from the FIT server and performs the received fault actions in operation S630. Then, a fault action performance result is displayed on the FIT client in operation S640.

Preferably, when the FIT points are set in operation S610, and call paths that receive fault actions from the FIT server may be set in a case where faults, which are injected into the set FIT points and have the same fault type or different fault types, are sequentially performed in an order set by the FIT client.

As described above, according to the one or more of the above embodiments of the present invention, a fault injection testing apparatus and method allow a user to predict problems that occur in a certain system, a source file, a program or the like and to find which errors the system, source file or the program has.

The invention can also be embodied as computer readable codes on a computer readable recording medium. The computer readable recording medium is any data storage device that can store programs or data which can be thereafter read by a computer system.

Examples of the computer readable recording medium include read-only memory (ROM), random-access memory (RAM), CD-ROMs, magnetic tapes, hard disks, floppy disks, flash memory, optical data storage devices, and so on. The computer readable recording medium can also be distributed over network coupled computer systems so that the computer readable code is stored and executed in a distributive manner. This media can be read by the computer, stored in the memory, and executed by the processor.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A fault injection testing apparatus for testing quality of a source file by interacting with a fault injection test (FIT) client, the fault injection testing apparatus comprising:

an FIT point setting unit for setting one or more FIT points in the source file via the FIT client;

a fault injection unit for injecting one or more faults to be respectively performed at the one or more FIT points in the FIT client;

a fault action performance unit for receiving fault actions, which are countermeasures to the one or more faults to be respectively performed at the one or more FIT points, from an FIT server and performing the received fault actions; and a display unit for displaying a fault action performance result on the FIT client, wherein the fault injection testing apparatus communicates with the FIT server in each of the FIT points.

2. The fault injection testing apparatus of claim 1, wherein the one or more faults, which are injected by the fault injection unit, have either the same fault type or different fault types and comprise at least one of a memory limit fault, a network limit fault, a file_descriptor fault and a recovery fault.

3. The fault injection testing apparatus of claim 1, wherein the FIT setting unit sets a plurality of FIT points and then supports a function that sets call paths receiving actions from the FIT server when the one or more faults, which are injected by the fault injection unit and have either the same fault type or different fault types, are sequentially performed at the plurality of set FIT points in an order set by the FIT client.

4. A fault injection testing method using a fault injection test (FIT) in a fault injection testing apparatus, which is executed by a computer, the fault injection testing method comprises:

setting one or more FIT points in a source file via a FIT client;

injecting one or more faults to be respectively performed at the one or more FIT points into the FIT client;

receiving fault actions, which are countermeasures to the one or more faults to be respectively performed at the one or more FIT points, from an FIT server, and performing the received fault actions; and displaying a fault action performance result on the FIT client.

5. The fault injection testing method of claim 4, wherein the fault injection testing apparatus communicates with the FIT server at each of the one or more FIT points.

6. The fault injection testing method of claim 4, wherein, in the injecting of the one or more faults, the one or more injected faults have the same fault type or different fault types and comprise at least one of a memory limit fault, a network limit fault, a file_descriptor fault and a recovery fault.

7. The fault injection testing method of claim 4, further comprising setting a trigger count which performs a preset action only when identical faults occur a preset number of times or more after the injecting of the faults.

8. The fault injection testing method of claim 4, wherein the fault injection testing apparatus comprises a fault library in which the one or more injected faults and fault actions corresponding to the one or more injected fault are stored, wherein the fault library further comprises a fault action performance result.

9. The fault injection testing method of claim 4, wherein a function for setting call paths which receive actions from the FIT server is supported when the one or more FIT points are set in the setting of the one or more FIT points and when the one or more faults, which are injected in the one or more FIT points and have the same fault type or different fault types, are sequentially performed in an order set by the FIT client.

10. The fault injection testing method of claim 4, wherein each of the one or more injected faults comprises at least one of fault order information (ID) that indicates an order in which the one or more faults are injected into a source file, identifier information (UID) that identifies the one or more faults in the source file, fault occurrence information (ACTIVATION) that indicates whether the one or more faults have occurred, total number information (TOTAL) that indicates the occurrence number of times of faults that is normally allowed even though the one or more faults have occurred in the source file, number information (HIT) which indicates the number of times that the one or more faults have occurred in the source file, repetition information (REPETITION) which indicates whether the one or more faults need to repeatedly occur, fault action information (ACTION) which indicates the fault actions to be performed when the one or more faults occur, and identifier information of the FIT server which transmits the fault actions.

11. The fault injection testing method of claim 4, wherein the FIT client performs distributed processing by receiving the fault actions with regard to the one or more injected faults from one or more FIT servers.

12. The fault injection testing method of claim 4, wherein all pieces of information about the one or more faults injected by FIT client are stored.

13. The fault injection testing method of claim 4, wherein the fault injection testing apparatus provides functions that additionally inject faults to the FIT client, modify, delete and check the additionally injected faults.

* * * * *